June 4, 1940.   J. L. SPENCE, JR   2,203,032
ENDLESS LOOP FILM MAGAZINE
Filed Aug. 18, 1939

INVENTOR
John L. Spence, Jr.
BY
Kenyon & Kenyon
ATTORNEYS

Patented June 4, 1940

2,203,032

UNITED STATES PATENT OFFICE 2,203,032

ENDLESS LOOP FILM MAGAZINE

John L. Spence, Jr., Brooklyn, N. Y., assignor to Leventhal Patents, Inc., New York, N. Y., a corporation of Delaware Application August 18, 1939, Serial No. 290,772

4 Claims. (Cl. 88—18.7)

This invention relates to endless loop film magazines.

In continuous motion picture projectors such as those used for advertising purposes, a length of film is repeatedly projected. The film is in the form of an endless loop and usually is in the form of a coil supported on rollers. The handling of the film during loading and unloading in such an apparatus is usually difficult and a magazine already loaded with a loop having a portion hanging out has been found to be the most desirable arrangement. Such magazines snap into place on the projector and the loop is threaded around the projector rollers and through the projection gate in the usual manner.

Obviously, the magazines far outnumber the projectors and it is desirable that the magazines be as inexpensive as possible. The magazines consist essentially of a plate furnished with film supporting rollers and film guiding rollers. The chief item of expense in the magazines is the rollers with their shafts and bearings and the cost of the magazines can be materially decreased by reducing the number of rollers.

An object of this invention is to reduce the required number of rollers in a film loop magazine by providing the projector with film guiding rollers which project into the magazine through apertures provided for that purpose in the plate. The film guiding rollers are thus a permanent part of the projector and the expense of the magazines is correspondingly decreased.

Figure 1:
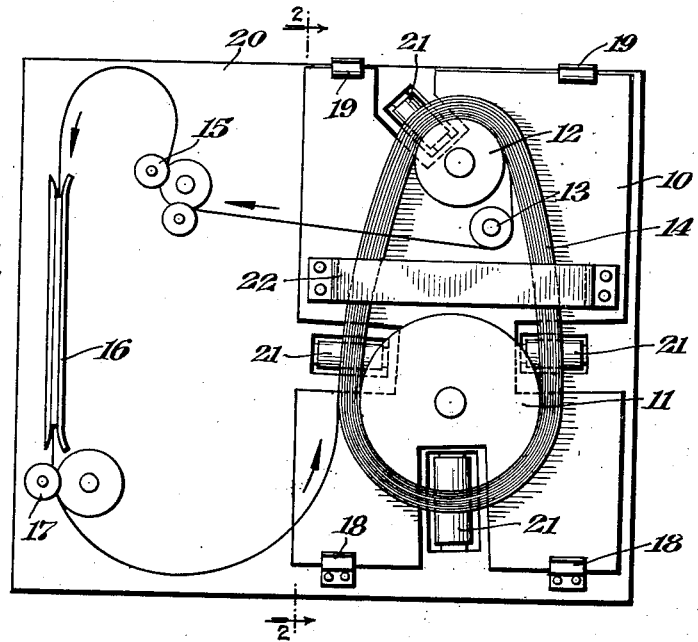
Figure 2:
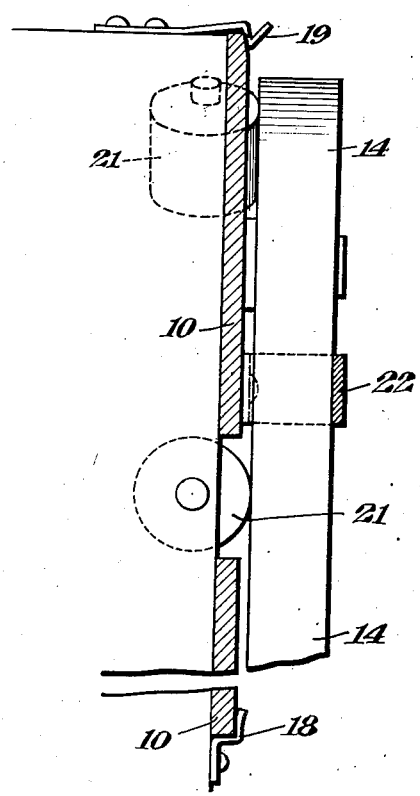

Other objects, novel features and advantages of this invention will become apparent from the following specification and accompanying drawing, wherein:

Fig. 1 is a front view of a magazine embodying the invention applied to a projector, and Fig. 2 is a section on the line 2—2 of Fig. 1.

A plate 10 is provided with film supporting rollers 11, 12 and 13 having their axes perpendicular to the plate. An endless loop of film in the general form of a coil 14 is supported by the rollers 11 and 12 and from the roller 12 the film passes around the roller 13 through the projector rollers 15, film gate 16 and projector rollers 17 back to the outside of the coil 14. Clips 18 and 19 provided on the projector 20 serve to clamp the plate 10 to the projector 20.

In the wall of the projector are suitably journalled a plurality of rollers 21 having their axes parallel to the plate 10 or perpendicular to the rollers 11 and 12. The plate 10 is provided with a corresponding number of openings through which project the curved surfaces of the rollers 21 sufficiently to contact the edge of the film coil 14. A film coil retainer 22 is carried by the plate 10 and prevents movement of the coil away from the rollers 21.

The rollers 11 and 12 constitute film-winding rollers while the rollers 21 constitute film edge guide rollers which are rotated by frictional contact of the edge of the moving coil of film. The rollers 21 are suitably arranged in the projector wall to give the coil the desired guidance and constitute a permanent part of the projector. With this arrangement, the number of rollers required in the magazine is reduced by the number of rollers 21 provided in the projector, thus very materially reducing the cost of the magazines.

I claim:

1. In combination with a motion picture projector having a plurality of rollers journalled in a wall thereof in predetermined relation to each other and having their curved surfaces projecting beyond the surface of said wall, a plate, means for attaching said plate to said projector in contact with said wall, rollers journalled in said plate perpendicular to the aforementioned rollers and being adapted to support an endless loop of film, said plate having openings through which the first mentioned rollers project sufficiently to contact the edge of the film loop supported by the last-mentioned rollers.

2. In combination with a motion picture projector having a plurality of rollers journalled in a wall thereof in predetermined relation to each other and having their curved surfaces projecting beyond the surface of said wall, a plate, means for attaching said plate to said projector in contact with said wall, rollers journalled in said plate perpendicular to the aforementioned rollers and being adapted to support an endless loop of film, said plate having openings through which the first mentioned rollers project sufficiently to contact the edge of the film loop supported by the last-mentioned rollers, and film-retaining means preventing movement of said film loop away from said plate.

3. In combination with a motion picture projector having a plurality of rollers supported by a wall of said projector in predetermined relation to each other and having their axes parallel to said wall, a plate, means for attaching said plate to said projector wall, rollers supported by said plate for rotation about axes perpendicular to said plate and being adapted to support an endless loop of film, said plate having openings through which the curved surfaces of said first mentioned rollers project sufficiently to engage the edge of said film loop.

4. In combination with a motion picture projector having a plurality of rollers supported by a wall of said projector in predetermined relation to each other and having their axes parallel to said wall, a plate, means for attaching said plate to said projector wall, rollers supported by said plate for rotation about axes perpendicular to said plate and being adapted to support an endless loop of film, said plate having openings through which the curved surfaces of said first mentioned rollers project sufficiently to engage the edge of said film loop, and film retaining means for preventing movement of said film loop away from said plate.

JOHN L. SPENCE, Jr.